Figure 1:
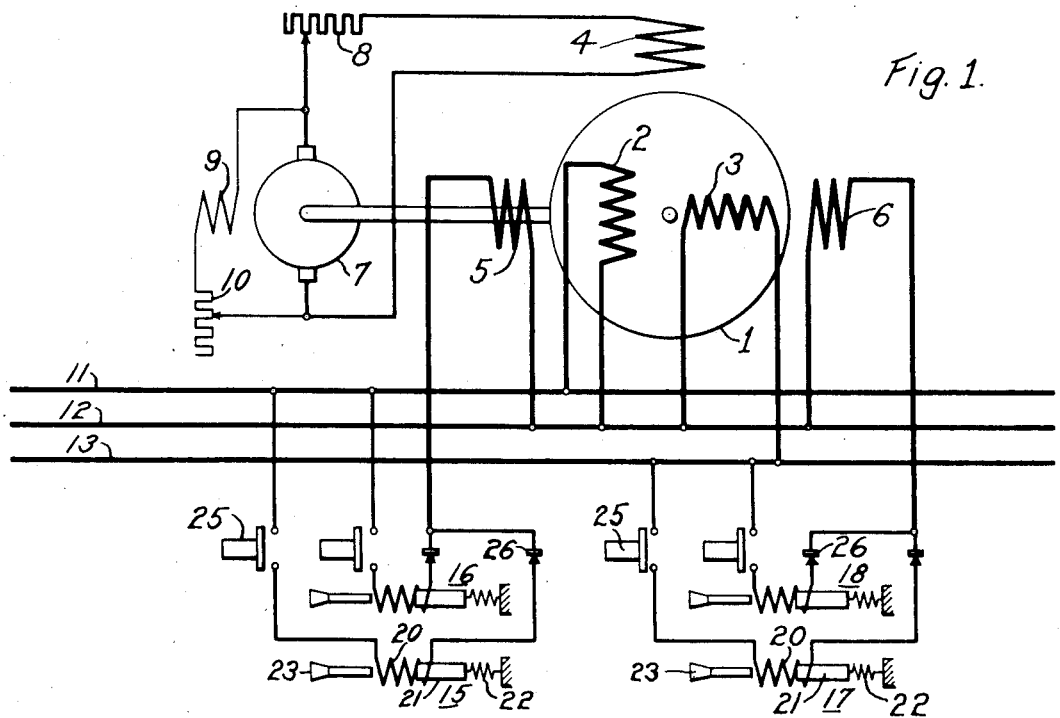

Aug. 8, 1939.  R. S. ELBERTY, JR  2,169,024

REGULATION

Filed Jan. 28, 1938

WITNESSES:
Wm. B. Sellers
J. E. Foster

INVENTOR
Robert S. Elberty, Jr.
BY
Paul E. Friedemann
ATTORNEY

Patented Aug. 8, 1939

2,169,024

UNITED STATES PATENT OFFICE 2,169,024

REGULATION

Robert S. Elberty, Jr., Waynesboro, Pa., assignor to Westinghouse Electric & Manufacturing Company, East Pittsburgh, Pa., a corporation of Pennsylvania Application January 28, 1938, Serial No. 187,458

8 Claims. (Cl. 172—240)

This invention relates to a system for obtaining voltage regulation of an alternating-current generator and particularly for such a generator as is used to supply current to one or more electric hammers of the type that are operated by direct-current impulses obtained by rectification of the alternating current generated by the generator.

One object of the invention is to provide good voltage regulation, in an inexpensive machine, that is comparable with the voltage regulation that may be obtained in a more expensive generator.

Another object of the invention is to obtain the advantage of the lighter weight of the less expensive machine in order to provide greater portability.

One type of electric hammer that is marketed at the present time is operated by segregated direct-current impulses derived from an alternating current by suitable rectifying means. When hammers of larger size are employed in gang operation, as for pavement breaking or for tie tamping work, a gas-engine-driven generator is employed as a source of energy for the several hammer units. The alternating current from the generator is rectified, and segregated impulses of the rectified current are supplied to the hammer windings to actuate and drive a floating metal core, as an impact weight, against the pavement breaking chisel, or against the tie tamping tool, with which the hammer is used. In order to obtain maximum efficiency from the hammers, it is essential that the operating voltage be maintained within a close range.

Since, in practice, a number of tie tampers, or pavement breakers, up to a gang of eight, may be supplied from one generator, it is very desirable to regulate the field strength according to the number of hammer units supplied from the generator, in order to maintain the operating voltage at the proper value. Such voltage regulation may be obtained, of course, by manual adjustment of the usual rheostat connected in the shunt field winding circuit, which is usually energized from a direct connected exciter. Better voltage regulation may be obtained, however, for this type of service, by compounding, derived from excitation of series field windings, in accordance with the total load current supplied to the hammers. By means of such compounding arrangement, a less expensive and a much lighter generator unit may be employed. This latter feature is of extreme importance. The engine-driven-generator combinations employed for this service must be as light as possible, because they are frequently used on railway track line sections where it is desirable or necessary to keep the track line open for service. For that reason, it is necessary to be able to remove, from the tracks, the entire carriage structure on which the engine-generator combination unit is mounted and carried to the location where the work is to be done.

In the operation of the electric hammers, rectifying devices are utilized to control and rectify the supply of energy from the alternating-current generator to the hammer windings. I make further use of the same rectifier devices, and of the load current supplied by them to the hammer, by arranging that the rectified load current to the hammer shall be transmitted through a series field magnet winding of the generator to provide for voltage compounding in accordance with the total hammer load upon the generator.

Figure 2:
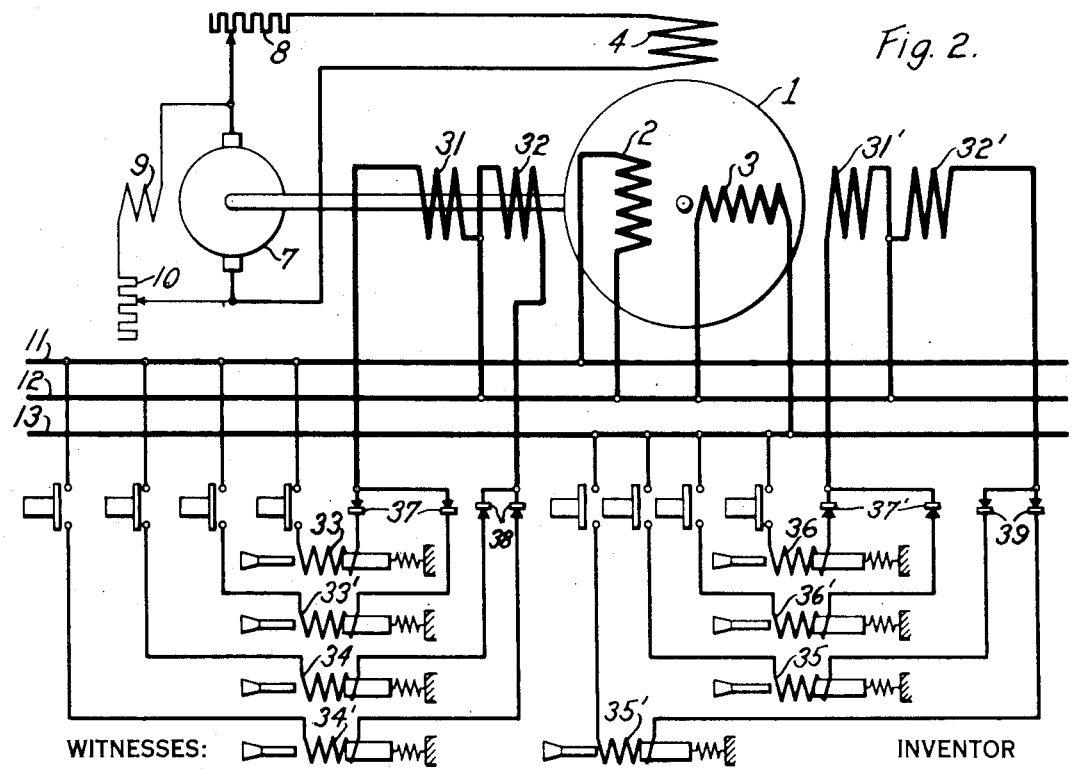

The manner in which the entire system functions is illustrated in the accompanying diagrams, in which Figure 1 illustrates the use of one field winding for a group of hammers per phase winding; and Fig. 2 illustrates the use of two field windings for a group of hammers per phase winding to utilize the full capacity of the generator phase winding.

As shown in the diagram of Fig. 1, an alternating-current generator 1 is shown as comprising two separate and distinct phase windings 2 and 3, to constitute a two-phase generator, and the generator is further provided with a separately excited field winding 4 and two series windings 5 and 6. The field winding 4 is energized from a direct-connected exciter 7 through an adjustable rheostat 8. The exciter is provided with the usual shunt field winding 9 that is controlled through a variable rheostat 10.

For convenience, each phase winding of the main generator 1 is shown connected to bus conductors 11, 12 and 13, the middle bus conductor 12 serving as a common conductor for both phases. The energy from the generator 1 is supplied to four electric hammers 15 and 16, and 17 and 18 of the type illustrated. In each of these hammers an electromagnet, as 20, when energized, attracts and actuates a floating core 21, against the restraining action of a biasing spring 22, to a position at which the floating core 21 strikes a chisel or tie-tamping tool 23. The hammer electromagnet 20 is energized from the first phase between conductors 11 and 12 through a manually operable switch 25 and a rectifier unit 26. The circuit of the electromagnet 20 of the hammer 15 includes the series field magnet winding 5 of the generator so that the hammer current, as rectified by the rectifier 26, energizes the series field winding 5 to provide a compounding effect according to the load taken by the hammer 15. Each of the other hammers is provided with similar electromagnets for actuating similar floating cores, against the restraining action of their restoring springs, to strike a working tool of the type mentioned. Each hammer winding is similarly provided with a manually operable switch and a rectifier unit for supplying a rectified direct-current impulse to the hammer winding from the generator.

As shown in Fig. 1, the two hammer units 15 and 16 are energized from the first phase, between conductors 11 and 12. The other two hammer units 17 and 18 are shown energized from the second phase, between conductors 12 and 13 and through rectifiers energize field winding 6.

In Fig. 2, I have illustrated briefly the manner in which the full wave energy of each phase winding may be utilized to energize the field windings. With such an arrangement, two field windings 31 and 32 and 31' and 32' are provided for each phase. Field winding 31 is connected in series with two hammer units 33 and 33' in a manner similar to that illustrated in Fig. 1. Field winding 32 is connected in series with two hammers 34 and 34'. As shown in Fig. 2, the energy of one group of current waves, for example, the positive waves, may be controlled by the rectifiers 37 and 37' so they will energize the field windings 31, and 31'; and the rectifiers 38 and 39 connected with the hammers 34 and 34' and 35 and 35' will transmit the negative waves to the field windings 32 and 32', respectively. The rectifiers 37' control the circuit of winding 31' and hammers 36 and 36'.

The phase winding 3 of the generator supplies energy to a group of hammers connected across that phase winding, similar to the connections illustrated for the hammers connected across the phase winding 2.

Additional hammers may be added to the load, with connections similar to those indicated, in which each hammer has its own manually operable switch to control the energization of the hammer, and also has its own rectifier unit to supply segregated direct-current impulses from the alternating-current generator.

As each hammer is added to the load, the additional current required by it correspondingly energizes the series field magnet windings connected in the circuit of the corresponding phase, and such energization of the series field windings provides a compounding effect that serves to maintain the proper generator voltage for the proper operation of the hammer units.

For the type of work such as pavement breaking or tie tamping, it is preferable to use a low-frequency generator such as a 25-cycle machine in order to provide a larger quantity of energy per impulse, as well as to provide a sufficient time to actuate the core and to restore it to its initial position.

By means of such arrangement in which the load current may be utilized to supply a compounding effect to the field excitation, I may employ a much cheaper generator. A cheaper generator usually has relatively and inherently poor voltage regulation characteristics, so far as the separately excited field winding alone is concerned. Such a generator is much lighter and less expensive than one in which the inherent voltage regulation would be relatively good.

Since the generator and its driving engine must be carried to the place of operation, and must frequently be used on track sections for tamping operations, the matter of weight becomes an important one. If service over track section is not to be interrupted while the tamping work is being done, the entire carriage upon which the engine and generator are mounted must be sufficiently light to be removable from the track section, to permit normal scheduled traffic over the track section. By means of the type of voltage regulation which I have described herein, a much smaller and lighter generator may be employed than would otherwise be necessary, where the design of the generator was such as to provide inherently good regulation as needed for this service.

It will be obvious that the circuits may be rearranged and that the generator need not be limited to a two-phase type. The invention is thus not limited to the exact details illustrated, but may be modified by one skilled in the art, the embodiments herein shown being merely illustrative of the principles of my invention.

I claim as my invention:

1. In combination, an alternating-current generator provided with series field windings, one or more electro-magnetic hammers, having operating coils, for impulse actuation by energy supplied to the coils from the generator, a rectifier for each hammer coil, said rectifier being separate from and independent of said generator, and means connecting a series field winding in series with each rectifier and hammer coil, to provide a compounding effect by the current of each hammer coil, thereby to provide self-regulation of the generator by each hammer, to provide proper generator voltage for which the hammers are designed.

2. The combination, comprising, an armature winding of an alternating-current generator, a series field winding of the generator, a rectifier element, said rectifier element being separate from and independent of said generator, and a direct-current impulse energy motor, all connected in series in a closed circuit.

3. In combination, an alternating-current generator having a series field winding, a direct-current energy motor, and means including a rectifying device connecting the generator armature winding, the generator series field winding and the direct-current motor in a series circuit, said rectifying device being separate from and independent of said generator.

4. In an electric system, the combination with an alternating-current generator having a series field winding, and a load therefor consisting of a variable number of similar devices adapted for direct-current energization at relatively uniform and constant voltage, of a rectifier between the generator and each load device, said rectifier being separate from and independent of said generator, and means connecting the series field winding in the circuit including each load element.

5. A system for supplying operating energy to a variable number of electric hammers adapted for direct-current energization at relatively uniform and constant voltage, said system comprising an alternating-current generator having series field windings, and means including rectifying means connecting the generator armature winding and the series field winding in series circuit relation with the electric hammers, whereby the load current to the hammers will provide a compounding effect through the series field windings, to maintain the proper operating voltage, said rectifying means being separate from and independent of said generator.

6. In an electric system, the combination with an alternating current generator having a series field winding, and a plurality of separate phase armature windings, of a load consisting of a variable number of direct-current electro-magnetic hammers, and means including a rectifier for connecting each hammer in circuit with one armature phase winding and the field winding, said rectifier being separate from and independent of said generator.

7. In an electric system, the combination with an alternating-current generator having a series field winding, and a plurality of separate phase armature windings, of a load consisting of a variable number of direct-current electro-magnetic hammers, and means including a rectifier for connecting each hammer in circuit with one armature phase winding and the field winding, said rectifier being separate from and independent of said generator, an armature winding and two series field windings, of a load consisting of a variable number of direct-current electro-magnetic hammers, and means including a rectifier connecting each hammer in circuit with the armature winding and with one of the field windings, some of the rectifiers being connected to transmit current waves of one polarity and others of the rectifier being connected to transmit current waves of the opposite polarity, to permit the entire energy of the armature winding to be utilized.

8. In an electric system, the combination with an alternating-current generator having an armature and two series field windings, of a load consisting of a variable number of direct-current electro-magnetic impulse motors, and means including a rectifier connecting each motor in circuit with the armature winding and one of the field windings, so that all of the energy from the current waves of both polarities of the armature winding will be utilized, said rectifier being separate from and independent of said generator.

ROBERT S. ELBERTY, Jr.